United States Patent
Mohammad et al.

(10) Patent No.: US 9,936,290 B2
(45) Date of Patent: Apr. 3, 2018

(54) MULTI-CHANNEL ECHO CANCELLATION AND NOISE SUPPRESSION

(71) Applicant: QUALCOMM Incorporated, San Diego, CA (US)

(72) Inventors: Asif Iqbal Mohammad, San Diego, CA (US); Lae-Hoon Kim, San Diego, CA (US); Ian Ernan Liu, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 14/156,292

(22) Filed: Jan. 15, 2014

(65) Prior Publication Data
US 2014/0328490 A1 Nov. 6, 2014

Related U.S. Application Data

(60) Provisional application No. 61/819,423, filed on May 3, 2013.

(51) Int. Cl.
| | |
|---|---|
| *H04B 3/20* | (2006.01) |
| *H04M 9/08* | (2006.01) |
| *H04R 3/00* | (2006.01) |
| *G10K 11/16* | (2006.01) |

(52) U.S. Cl.
CPC ............ *H04R 3/002* (2013.01); *H04M 9/082* (2013.01)

(58) Field of Classification Search
CPC ...... H04R 2430/25; G10L 2021/02082; G10L 21/0208; G10L 2021/02166; G10L 21/02; G10L 21/0272; G10L 19/008; G10L 2021/02165; G10L 21/0216; H04B 3/23; H04B 3/237; H04B 3/20; H04B 3/493; G10K 11/16; G10K 2210/505
USPC ..... 381/66, 71.1, 92, 94.1, 94.3, 94.7, 1, 56, 381/58, 71.11, 80, 93; 379/406.08, 379/406.01, 392.01; 704/226, 233; 455/570
See application file for complete search history.

(56) References Cited

U.S. PATENT DOCUMENTS

| | | | | |
|---|---|---|---|---|
| 6,148,078 A | * | 11/2000 | Romesburg | H04M 9/082 379/406.07 |
| 7,359,504 B1 | * | 4/2008 | Reuss | H04M 9/082 379/406.01 |
| 8,213,598 B2 | * | 7/2012 | Bendersky | H04B 3/23 379/406.05 |

(Continued)

FOREIGN PATENT DOCUMENTS

WO 2010124176 A1 10/2010

OTHER PUBLICATIONS

International Search Report and Written Opinion—PCT/US2014/035190—ISA/EPO—Jul. 28, 2014.

*Primary Examiner* — Norman Yu
(74) *Attorney, Agent, or Firm* — Austin Rapp & Hardman, P.C.

(57) ABSTRACT

A method for multi-channel echo cancellation and noise suppression is described. One of multiple echo estimates is selected for non-linear echo cancellation. Echo notch masking is performed on a noise-suppressed signal based on an echo direction of arrival (DOA) to produce an echo-suppressed signal. Non-linear echo cancellation is performed on the echo-suppressed signal based, at least in part, on the selected echo estimate.

25 Claims, 9 Drawing Sheets

(56) References Cited

U.S. PATENT DOCUMENTS

| | | |
|---|---|---|
| 8,498,423 B2 | 7/2013 | Thaden et al. |
| 9,202,456 B2 | 12/2015 | Lee et al. |
| 2006/0250998 A1* | 11/2006 | Beaucoup ............. H04M 9/082 370/286 |
| 2007/0263850 A1 | 11/2007 | Stokes et al. |
| 2009/0238377 A1 | 9/2009 | Ramakrishnan et al. |
| 2009/0281805 A1 | 11/2009 | Leblanc et al. |
| 2012/0249785 A1* | 10/2012 | Sudo ...................... H04N 7/183 348/143 |
| 2012/0250882 A1 | 10/2012 | Mohammad et al. |
| 2013/0129101 A1 | 5/2013 | Tashev et al. |
| 2013/0332157 A1* | 12/2013 | Iyengar .................. G10L 15/20 704/233 |

* cited by examiner

MULTI-CHANNEL ECHO CANCELLATION AND NOISE SUPPRESSION

RELATED APPLICATIONS

This application is related to and claims priority from U.S. Provisional Patent Application Ser. No. 61/819,423, filed May 3, 2013, for "MULTI-CHANNEL ECHO CANCELLATION AND NOISE SUPPRESSION."

TECHNICAL FIELD

The present disclosure relates generally to electronic devices. More specifically, the present disclosure relates to multi-channel echo cancellation and noise suppression.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

Wireless communication systems are widely deployed to provide various types of communication content such as voice, video, data and so on. These systems may be multiple-access systems capable of supporting simultaneous communication of multiple communication devices with one or more base stations.

To improve voice quality in a wireless communication system, a communication device may use various signal processing techniques. These techniques may attempt to recreate/preserve a speaker's voice while eliminating unwanted sounds. Therefore, benefits may be realized by systems and methods for multi-channel echo cancellation and noise suppression.

SUMMARY

A method for multi-channel echo cancellation and noise suppression is described. One of multiple echo estimates is selected for non-linear echo cancellation. Echo notch masking is performed on a noise-suppressed signal based on an echo direction of arrival (DOA) to produce an echo-suppressed signal. Non-linear echo cancellation is performed on the echo-suppressed signal based, at least in part, on the selected echo estimate.

The one of multiple echo estimates may be one of a spatial-processed echo estimate, a primary microphone echo estimate and a secondary microphone echo estimate. The selecting one of multiple echo estimates may include selecting a maxima of the multiple echo estimates. The selecting one of multiple echo estimates may include combining multiple echo estimates to produce the selected echo estimate.

Echo notch masking may include determining a masking gain based on a speech likelihood and the echo DOA. Echo notch masking may also include applying the masking gain to the noise-suppressed signal to produce the echo-suppressed signal.

Performing non-linear echo cancellation may include using a non-linear model of echo based on the selected echo estimate and the echo-suppressed signal.

A computer-program product for multi-channel echo cancellation and noise suppression is also described. The computer-program product includes a non-transitory computer-readable medium having instructions thereon. The instructions include code for causing a communication device to select one of multiple echo estimates for non-linear echo cancellation. The instructions also include code for causing the communication device to perform echo notch masking on a noise-suppressed signal based on an echo DOA to produce an echo-suppressed signal. The instructions further include code for causing the communication device to perform non-linear echo cancellation on the echo-suppressed signal based, at least in part, on the selected echo estimate.

The noise-suppressed signal may be produced by causing the communication device to suppress noise in output of a linear echo cancellation of at least two microphone channels. The linear echo cancellation may include subtracting a primary microphone echo estimate from a primary microphone channel. The linear echo cancellation may also include subtracting a secondary microphone echo estimate from a secondary microphone channel.

The computer-program product may further include code for causing the communication device to spatial process a primary microphone echo estimate and a secondary microphone echo estimate to produce a spatial-processed echo estimate. The spatial processing may replicate spatial processing that is performed by causing the communication device to suppress noise in output of the linear echo cancellation. The primary microphone echo estimate and the secondary microphone echo estimate may be determined during the linear echo cancellation.

The code for causing the communication device to determine the primary microphone echo estimate and the secondary microphone echo estimate may include code for causing the communication device to model a room response in an acoustic echo canceller (AEC) filter for a primary microphone and a secondary microphone. The primary microphone echo estimate may be determined based on the room response for the primary microphone. The second microphone echo estimate may be determined based on the room response for the secondary microphone.

A communication device for multi-channel echo cancellation and noise suppression is also described. The communication device includes a processor, memory in electronic communication with the processor, and instructions stored in memory. The instructions are executable to select one of multiple echo estimates for non-linear echo cancellation. The instructions are also executable to perform echo notch masking on a noise-suppressed signal based on an echo DOA to produce an echo-suppressed signal. The instructions are further executable to perform non-linear echo cancellation on the echo-suppressed signal based, at least in part, on the selected echo estimate.

The instructions executable to perform echo notch masking may be further based on an indication of far-end speech. The echo DOA may be determined based on a location of one or more microphones and one or more loudspeakers. The echo DOA may be determined during a calibration stage. The echo DOA may be determined in real-time when far-end activity is detected.

The instructions executable to perform echo notch masking may include instructions executable to determine a masking gain based on a speech likelihood and the echo DOA. The instructions executable to perform echo notch masking may also include instructions executable to apply the masking gain to the noise-suppressed signal to produce the echo-suppressed signal.

The instructions executable to determine the masking gain may include instructions executable to apply a masking window located based on the echo DOA. The instructions executable to determine the masking gain may also include instructions executable to determine an amount to suppress the noise-suppressed signal within the masking window.

A communication device for multi-channel echo cancellation and noise suppression is also described. The communication device may include means for selecting one of multiple echo estimates for non-linear echo cancellation. The communication device may also include means for performing echo notch masking on a noise-suppressed signal based on an echo DOA to produce an echo-suppressed signal. The communication device may further include means for performing non-linear echo cancellation on the echo-suppressed signal based, at least in part, on the selected echo estimate.

DETAILED DESCRIPTION

Signal enhancement, echo cancellation (EC) and noise suppression (NS) may be used in harsh acoustic environments. Since mobile phones and Bluetooth headsets are widely used outside the home or office environment, background noise may be substantial. Since the distance between the microphone and loudspeaker shrinks when the headset/handset gets smaller, the acoustic echo pickup becomes more severe. Furthermore, the acoustic echo may be non-linear due to the small size of loudspeakers in the headset/handset devices. Therefore, non-linear echo processors may be used to suppress the residual echo and give the users a pleasant full-duplex experience. Echo suppression methods other than EC may impair full-duplex communication and thus may only be acceptable as supplementary measures.

In the case where acoustic echoes are coming from an undesirable spatial direction, noise suppression modules may provide some echo suppression. For example, noise suppression modules may provide 0-15 decibels (dB) of echo suppression based on spatial directivity. In teleconferencing or car telephony environments, echo attenuation of at least 40 dB during single talk and 30 dB during double-talk may be used. An explicit echo canceller may be used to achieve this attenuation. Furthermore, it may be desirable for a microphone array to pick up a desired talker at a good signal-to-noise ratio and to provide signal enhancement, even when the desired talker is located relatively far away compared to the echo source. Thus, in order to accomplish an efficient and pleasant full-duplex conversation using such teleconferencing devices, acoustic echo cancellation and microphone arrays may be used and combined in a way to improve the overall performance of a multi-microphone echo cancellation noise suppression system. Inter-operability and integration of echo cancellation and noise suppression functionality may help to achieve superior performance.

Figure 1:
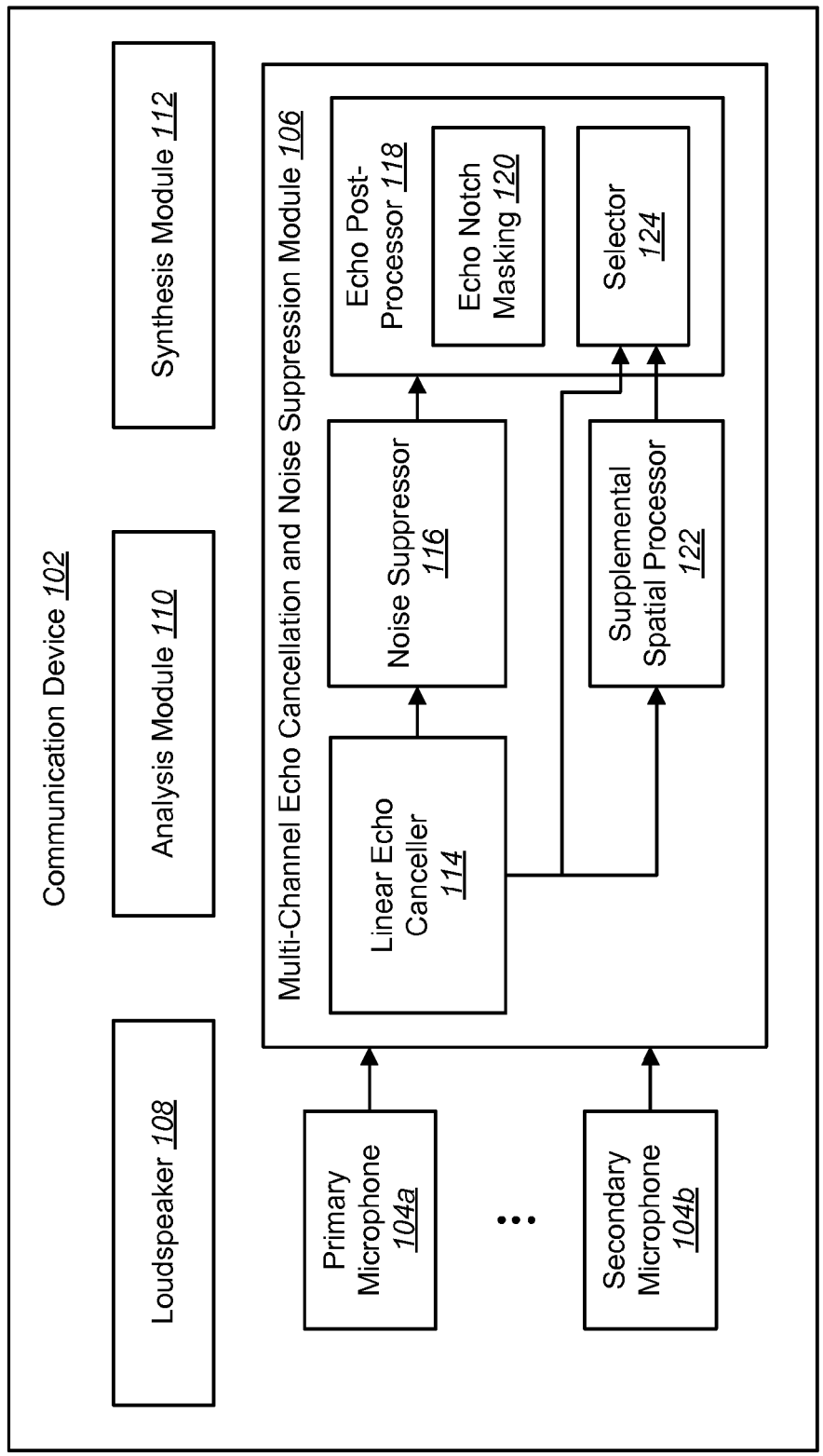
FIG. 1 is a block diagram illustrating a communication device with a multi-channel echo cancellation and noise suppression module.

FIG. 1 is a block diagram illustrating a communication device 102 with a multi-channel echo cancellation and noise suppression module 106. The communication device 102 may include a primary microphone 104a and one or more secondary microphones 104b that receive sound input from one or more sources (e.g., a loudspeaker 108, background noise, echo/echoes from a speaker/speakers (stereo/surround sound), etc.). Each of the microphones 104 may produce a signal or channel of audio that may be slightly different than one another. In one configuration, there may be two microphones 104 (e.g., a primary microphone 104a and a secondary microphone 104b) that produce two channels of audio, although any number of microphones 104 may be used. The microphones 104 and loudspeaker 108 may use additional modules (not shown) to process acoustic signals into digital audio and vice versa. For example, the communication device 102 may include analog-to-digital converters, digital-to-analog converters, audio buffers, an automatic volume control module, etc. The communication device 102 may also include more than one loudspeaker 108.

As used herein, the term "communication device" refers to an electronic device that may be used to receive, externally play and/or optimize audio to and from a user. Examples of communication devices 102 include telephones, speaker phones, cellular phones, personal digital assistants (PDAs), handheld devices, wireless modems, laptop computers, personal computers, etc. A communication device 102 may alternatively be referred to as an access terminal, a mobile terminal, a mobile station, a remote station, a user terminal, a terminal, a subscriber unit, a subscriber station, a mobile device, a wireless device, a wireless communication device, a user equipment (UE) or some other similar terminology.

The communication device 102 may also include an analysis module 110 and a synthesis module 112 to deconstruct and reconstruct audio signals, respectively. This may allow other modules discussed herein to process the audio (e.g., perform echo cancellation and noise suppression). The analysis module 110 and synthesis module 112 may refer to finite impulse response filter (FIR) banks that decompose a wideband signal into sub-bands and reconstructs the sub-bands into a single band, respectively.

Echo cancellation (EC) and multi-microphone noise suppression (NS), such as beamforming or masking, may be two distinct signal processing concepts, however their goals may converge with regard to acoustic echoes. Specifically, linear echo cancellation may subtract an echo estimate from the desired signal based on reference information, while noise suppression may blindly remove undesired interference (e.g., echoes) within a microphone signal using spatial filtering. Therefore, the communication device 102 may include a multi-channel echo cancellation and noise suppression module 106 with a linear echo canceller (LEC) 114, a noise suppressor (NS) 116 and an echo post-processor 118.

The linear echo canceller 114 may perform linear echo cancellation for selected frequencies for the signals received from the microphones 104. In one configuration, the linear echo of the full band of frequencies received from the primary microphone 104a is cancelled while LEC is performed for only a set of low-band frequencies for the secondary (non-primary) microphones 104b. The frequencies selected for LEC on the secondary channels may correspond to the range of frequencies over which spatial processing in the noise suppressor is effective. As used herein, the "primary microphone" may refer to the microphone 104a closest to a user's mouth. All non-primary microphones may be considered secondary microphones 104b.

The noise suppressor 116 may perform spatial processing and noise suppression post-processing based on a noise reference from a spatial processor. In other words, the noise suppressor 116 may attenuate the echo as undesired interference based on spatial filtering.

The echo post-processor 118 may perform non-linear echo post-processing by attenuating the non-linear echoes. The echo post-processor 118 may also perform non-linear echo clipping and comfort noise injection. The echo post-processor 118 may include an echo notch masking module 120. The echo notch masking module 120 may reduce echo in a noise-suppressed signal from the noise suppressor 116. The echo notch masking module 120 may perform amplitude suppression based on an echo direction of arrival (DOA) and speech likelihood information. Using the speech likelihood information, frequency bins with a high-likelihood for an echo direction of arrival (DOA) can be suppressed.

Occasionally, adaptive spatial processing used by a noise suppressor 116 adds echo from the secondary microphone 104b to the primary microphone 104a and the echo post-processor 118 may be blind to this. Since the echo post-processor 118 is blind to this echo, the echo post-processor 118 may not be able to cancel this added echo. This residual echo may be perceivable to the listener and highly annoying when there is almost little or no echo in the primary microphone 104a to begin with.

Therefore, the present systems and methods may provide the echo post-processor 118 with additional information that may be used with a non-linear echo model to cancel the residual echo. In one configuration, a spatial-processed echo estimate may be determined by a supplemental spatial processor 122. Therefore, the spatial processing performed by the supplemental spatial processor 122 on the echo estimate(s) from the linear echo canceller may replicate the processing done on linear echo-cleaned outputs by the noise suppressor 116. This may make the echo post-processor 118 aware of the spatial processing of the LEC 114 outputs (by the noise suppressor 116) so that the echo post-processor 118 does not add any echo in the primary microphone 104a. Alternatively, or in addition to, an echo estimate from a primary microphone 104a and at least one secondary microphone 104b may be used by the echo post-processor 118 to cancel non-linear echo.

A selector 124 may select the echo estimate that is provided to the echo post-processor 118. In one configuration, the selector 124 may select one of the primary microphone echo estimate, the secondary microphone echo estimate(s) or the spatial-processed echo estimate. The selector 124 may scale the selected echo estimate. The selector 124 may also select a combination of the primary microphone echo estimate, the secondary microphone echo estimate(s) or the spatial-processed echo estimate. It should be noted that in the configuration illustrated in FIG. 1, the selector 124 is included in the echo post-processor 118. In another configuration, the selector 124 may be located outside the echo post-processor 118.

Figure 1A:
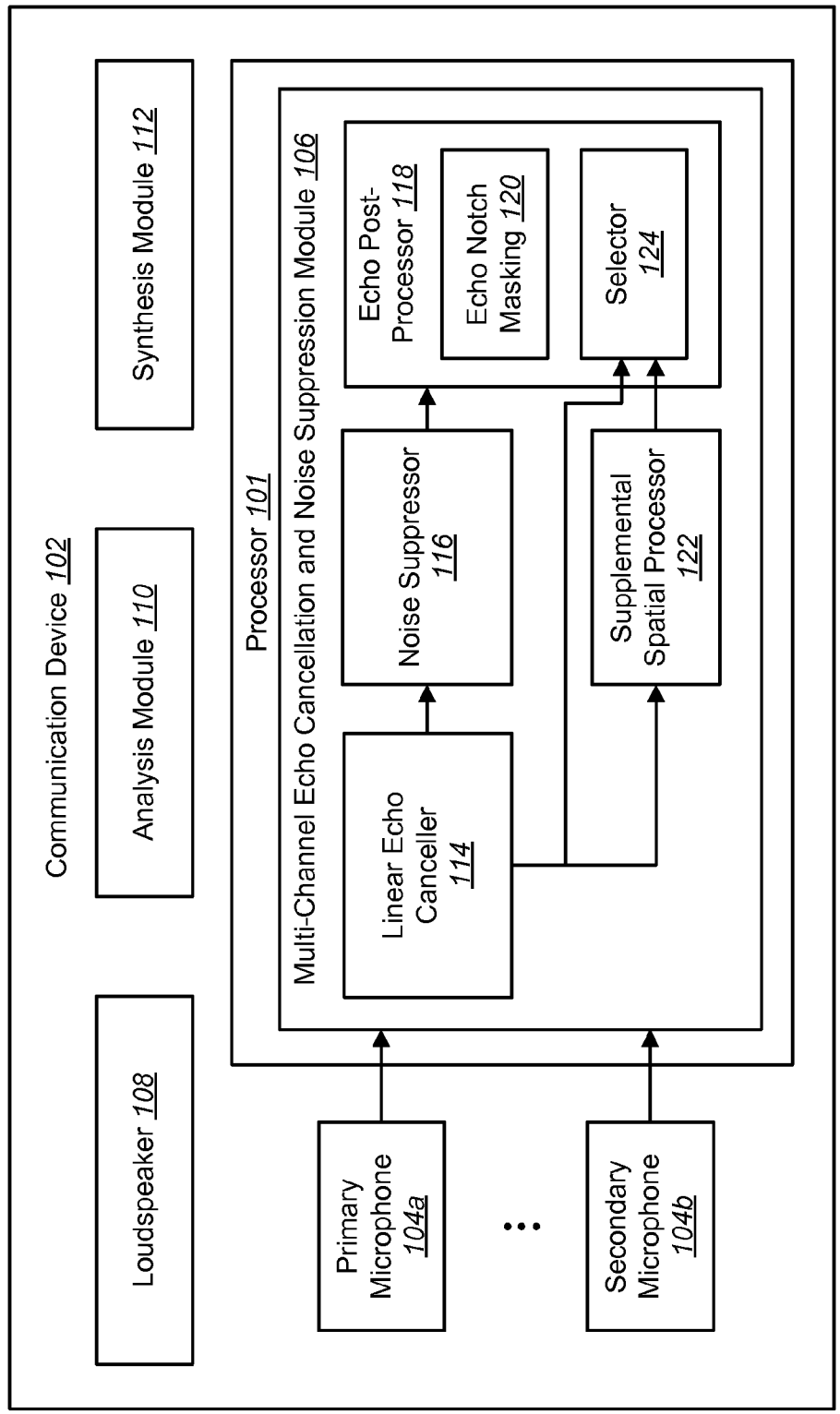
FIG. 1A illustrates some components within the system of FIG. 1 being implemented by a processor.

As shown in FIG. 1A, the multi-channel echo cancellation and noise suppression module 106 may be implemented by a processor 101. Alternatively, different processors may be used to implement different components (e.g., one processor may perform linear echo cancellation, another processor may be used to perform noise suppression, another processor may be used to perform echo post-processing, and yet another processor may be used to perform supplemental spatial processing).

Figure 2:
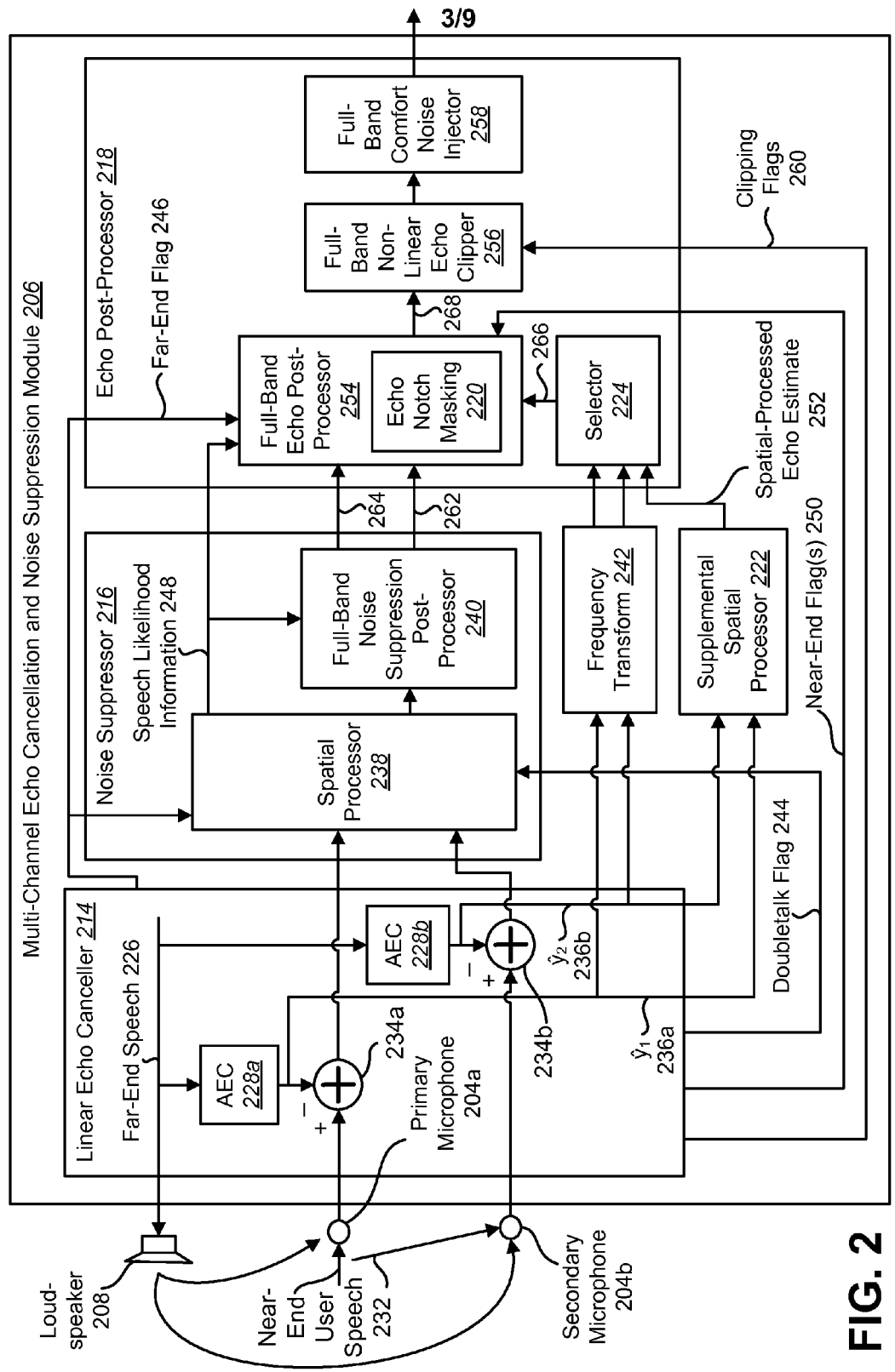
FIG. 2 is a block diagram illustrating one configuration of a multi-channel echo cancellation and noise suppression module.

FIG. 2 is a block diagram illustrating one configuration of a multi-channel echo cancellation and noise suppression module 206. The multi-channel echo cancellation and noise suppression module 206 may include a linear echo canceller 214, a noise suppressor 216 and an echo post-processor 218. For efficient echo cancellation, the linear echo canceller 214 may be at the front of the processing chain, i.e., to avoid any non-linear processes and to avoid re-modeling/re-learning the rapid variations in the processing path due to the spatial processor 238.

The linear echo canceller 214 may receive the primary audio channel from a primary microphone 204a and one or more secondary audio channels from one or more secondary microphones 204b. Since a loudspeaker 208 may play far-end speech 226 relatively close to the microphone(s) 204, compared to the desired talker, the microphone(s) 204 may see a near-end signal-to-echo ratio in the range of −5 to −12 dB. Thus, the full-band LEC and the sub-band LECs may be designed efficiently and in order to bring the residual echoes below the desired talker's level at all times for the spatial processor 238 to work optimally.

Specifically, the linear echo canceller 214 may use an acoustic echo cancelling (AEC) filter 228 to determine an echo estimate for each microphone 204 based on far-end speech 226. Each AEC filter 228 may use a room transfer function to determine the echo estimate for each microphone channel. One AEC filter 228a may determine the echo estimate for the primary microphone (referred to as the primary microphone echo estimate ($\hat{y}_1$) 236a) based on a transfer function measured at the primary microphone 204a. Similarly, another AEC filter 228b may determine the echo estimate for the secondary microphone (referred to as the secondary microphone echo estimate ($\hat{y}_2$) 236b) based on a transfer function measured at the secondary microphone 204b.

The primary microphone echo estimate ($\hat{y}_1$) 236a may be subtracted from the primary microphone channel using an adder 234a. Similarly, the secondary microphone echo estimate ($\hat{y}_2$) 236b may be subtracted from the secondary microphone channel using an adder 234b.

The linear echo-cleaned primary microphone channel and the linear echo-cleaned secondary microphone channel may be passed to a spatial processor 238 in the noise suppressor (NS) 216. Although illustrated with a single secondary microphone 204b, the present systems and methods may be used with any number of microphones 204.

Due to spatial aliasing, it is often difficult or impossible to discriminate spatially at higher frequencies. Therefore, linear echo cancellation may be performed only in a selected range of low frequencies on the secondary channels. The spatial processing within the noise suppressor 216 may only be done for this selected range of frequencies. In other words, linear echo cancellation for the secondary channels may only be performed in the frequency range over which spatial processing is effective (using the sub-band LECs).

Linear echo cancellation may be done on the entire band only for the primary channel (using the full-band LEC), so the higher frequencies of the primary microphone 204a survive the spatial processor 238 as shown in FIG. 2. In other words, the spatial processor 238 of the NS 216 may take the selected low frequencies of each microphone channel and produce a corresponding set of spatially processed low frequencies.

Linear echo-cleaned higher frequencies of the primary microphone 204a may be combined with the low frequencies and provided to the full-band noise suppression post-processor 240, which works on the entire band of data. Noise suppression post-processing may include non-linear, spectral-subtraction based processing where the noise reference from the spatial processing could serve as the unwanted component. Therefore, the noise suppression post-processor 240 may produce a noise-suppressed signal 262 and noise suppression gain 264 by suppressing noise in output of a linear echo cancellation of at least two microphone channels.

In an ideal environment, non-linear echo processing would not be used in an echo control system, i.e., the linear echo canceller 214 would be sufficient to achieve echo-free full duplex conversation. However, the one or more linear adaptive filters used in an acoustic echo canceller (AEC) filter 228 in the linear echo canceller 214 may only remove linear echo. In other words, the linear echo canceller 214 may not be able to suppress non-linear echo components that are typically mixed with the linear echo. This remaining non-linear echo may be audible and may degrade the overall quality of communication. Furthermore, the adaptive filter used in an acoustic echo canceller (AEC) filter 228 to model the room response may be shorter than the true room response, thereby leaving some residual tail echo after the linear echo cancellation. To address this problem of residual tail/non-linear echo, typically a non-linear echo post-processor 218 may be employed.

The echo post-processor 218 may receive the noise-suppressed signal channel data 262 from the noise suppressor 216 and remove the residual tail and/or non-linear echo. Specifically, the full-band echo post-processor 254 may use a spectral subtraction-based scheme to remove any residual non-linear echo by using a model of the harmonic distortions created due to the loudspeaker 208. The full-band echo post-processor 254 may produce a non-linear echo-suppressed signal 268.

Occasionally, however, adaptive spatial processing used by a noise suppressor 216 adds echo from the secondary microphone 204b to the primary microphone 204a and the echo post-processor 218 may be blind to this. In some circumstances, a communication device 102 may include two or more microphones 204. For example, the primary microphone 204a may be placed away from the loudspeaker 208 (e.g., on the bottom of the communication device 102). The secondary microphone 204b may be placed near the loudspeaker 208 (e.g., on the top of the communication device 102). In this configuration, the primary microphone 204a that is placed away from the loudspeaker 208 may have lower echo compared to the secondary microphone 204b that is placed closer to the loudspeaker 208. Therefore, the secondary microphone 204b may pick up significantly stronger echo.

The linear echo canceller 214 may cancel the linear echo and provide the linear echo-suppressed signal(s) to the spatial processor 238 of the noise suppressor 216. However, after linear cancellation is performed, the primary audio channel from the primary microphone 204a may have no echo left over, but the secondary audio channel from the secondary microphone 204b may have a significant amount of echo. The spatial processor 238 may add the residual echo from the secondary microphone 204b to the primary microphone 204a due to the way the spatial processing works by adding and subtracting signals. Spatial processing may remove ambient noise and preserve near-end user speech 232. The spatial-processed signal is then provided to the full-band noise suppression post-processor 240 to produce a noise-suppressed signal 262 and noise suppression gain 264 that are provided to the echo post-processor 218. In other words, after spatial processing in the noise suppressor 216, the added echo may appear as part of the noise-suppressed signal 262 from the primary microphone 204a and the echo post-processor 218 may be blind to the added echo.

If the echo post-processor 218 is blind to this echo, the echo post-processor 218 may not be able to cancel this added echo. Therefore, to make the echo post-processor aware of the added echo, a selected echo estimate 266 may be provided to the full-band echo post-processor 254. Multiple echo estimates may be received at a selector 224. It should be noted that in the configuration illustrated in FIG. 2, the selector 224 is included in the echo post-processor 218. In another configuration, the selector 224 may be located outside the echo post-processor 218. The selector 224 may select one of the multiple echo estimates and pass the selected echo estimate 266 to the full-band echo post-processor 254.

One echo estimate that may be provided to the selector 224 is a spatial-processed echo estimate 252. In one configuration, the primary microphone echo estimate ($\hat{y}_1$) 236a and the secondary microphone echo estimate ($\hat{y}_2$) 236b may be spatially processed by a supplemental spatial processor 222 to produce the spatial-processed echo estimate 252. The spatial processing performed by the supplemental spatial processor 222 on the primary microphone echo estimate ($\hat{y}_1$) 236a and the secondary microphone echo estimate ($\hat{y}_2$) 236b may replicate the processing done on linear echo-cleaned outputs by the spatial processor 238 in the noise suppressor 216. The spatial-processed echo estimate 252 produced by the supplemental spatial processor 222 may be an estimate of the echo added by the spatial processor 238 in the noise suppressor 216.

Other echo estimates that may be provided to the selector 224 are the primary microphone echo estimate ($\hat{y}_1$) 236a and the secondary microphone echo estimate ($\hat{y}_2$) 236b. The primary microphone echo estimate ($\hat{y}_1$) 236a and the secondary microphone echo estimate ($\hat{y}_2$) 236b may be transformed into the frequency domain by a frequency transform module 242 before being passed to the echo post-processor 218 (by using a Fast Fourier Transform (FFT), for example).

The echo post-processor 218 may receive one of the multiple echo estimates for non-linear echo cancellation. In one configuration, the selector 224 may select one of the received echo estimates for processing by the full-band echo post-processor 254. For example, the selector 224 may select the spatial-processed echo estimate 252, the primary microphone echo estimate ($\hat{y}_1$) 236a or the secondary microphone echo estimate ($\hat{y}_2$) 236b for non-linear echo cancellation. The selector 224 may determine the selected echo estimate 266 based on a maxima of the received echo estimates. The selector 224 may scale the selected echo estimate 266.

The selected echo estimate 266 may also include a combination of signals. Selecting one of multiple echo estimates may include combining multiple echo estimates to produce a selected echo estimate 266. For example, two or more of the primary microphone echo estimate ($\hat{y}_1$) 236a, the secondary microphone echo estimate ($\hat{y}_2$) 236b and the spatial-processed echo estimate 252 may be combined in various ways. For instance, the selector 224 may directly combine the primary microphone echo estimate ($\hat{y}_1$) and a scaled or modified version of the secondary microphone echo estimate ($\hat{y}_2$). Alternatively, the selector 224 may also produce a signal that is a function of two or more of these signals, i.e. $f(\hat{y}_1,\hat{y}_2)$ or f(spatial_processed_echo_estimate, $\hat{y}_2$) or f(spatial_processed_echo_estimate, $\hat{y}_1$). For instance these functions may be maxima, addition, subtraction, scaling, average of these signals, average of the signal energies, etc.

The selected echo estimate 266 may be used by the full-band echo post-processor 254 with a non-linear echo model for cancelling non-linear echo. By providing the selected echo estimate 266 to the echo post-processor 218, the echo post-processor 218 may be aware of the spatial processing (by the spatial processor 238 in the noise suppressor 216) of the LEC outputs so that the echo post-processor 218 may cancel any residual echo in the primary microphone channel. In one configuration, the full-band echo post-processor 254 may perform spectral subtraction using the selected echo estimate 266 to cancel echo in the noise-suppressed signal 262.

The full-band echo post-processor 254 may include an echo notch masking module 220 to further reduce echo in the noise-suppressed signal 262. The echo notch masking module 220 may perform amplitude suppression based on speech likelihood information 248 that indicates the likelihood of a specific beam to be dominated by echo or not. In one configuration, the spatial processor 238 may determine the speech likelihood information 248 based on an anglogram, which may indicate the likelihood per angle per frequency bin for target speech. The spatial processor 238 may determine various spatial beams based on the primary and secondary microphone channels. Each beam may be associated with a particular direction (e.g., angle). For each frame in time, a range of frequencies may be grouped in frequency bins. For each angle, the spatial processor 238 may determine an estimated speech likelihood for each frequency bin. Using the speech likelihood information 248, frequency bins that have a high-likelihood for an echo direction of arrival (DOA) can be suppressed.

The echo DOA may be determined based on the location of the one or more microphones 204 and the one or more loudspeakers 208. In one configuration, if the one or more loudspeakers 208 are fixed with respect to the communication device 102, then the echo DOA may be determined during a calibration stage. In another configuration, if the one or more loudspeakers 208 are non-fixed (e.g., auxiliary) with respect to the communication device 102, then the echo DOA may be determined in real-time when far-end activity is detected. The echo DOA may be expressed as an angle.

Upon determining the echo DOA, the echo notch masking module 220 may determine a masking gain to apply to the noise-suppressed signal 262. The echo notch masking module 220 may selectively suppress frequency bins that are likely to include an echo signal. In one configuration, the echo notch masking module 220 may apply a masking window located based on the echo DOA with a certain margin around the echo DOA. If the direction of a frequency bin of the noise-suppressed signal 262 falls within the masking window, then the echo notch masking module 220 may apply a masking gain to the frequency bin to produce an echo-suppressed signal. In one configuration, the echo notch masking module 220 may be activated during far-end activity. For example, the echo notch masking module 220 may be activated upon receipt of a far-end flag 246 and may be deactivated upon receipt of a double-talk flag 244 or a near-end flag 250.

The full-band non-linear echo clipper 256 may then further suppress any residual echo. Therefore, the non-linear echo clipper 256 may alleviate the burden on the spectral subtraction-based scheme (in the echo post-processor 218) in removing strong residual echoes and thereby improving full-duplex capabilities. These modules may keep track of the echo attenuation provided blindly by the full-band NS post-processor 240 and update their gain accordingly, thereby preventing excessive echo attenuation. The full-band non-linear echo clipper 256 may receive the non-linear echo-suppressed signal 268. In one configuration, the full-band non-linear echo clipper 256 may use the non-linear echo model produced by the echo post-processor 218. These non-linear processes may modulate the noise floor and, if left un-addressed, may be annoying to the listener at the far-end. To handle these modulations, a full-band comfort noise injector 258 may undo the modulations applied to the noise floor due to these non-linear processes.

As used herein, the term "far-end" refers to something not in relative proximity to a communication device 102. Conversely the term "near-end" refers to something in relative proximity to the communication device 102. In other words, the speech of a user of the communication device 102 (e.g., near-end user speech 232) may generate a near-end signal while the speech of another person communicating remotely (far-end user) may generate a far-end signal.

In addition to using the illustrated sequence of an LEC 214, an NS 216 and an echo post-processor 218, one or more flags may be generated based on characteristics of the audio channels. These flags may be used to adapt the processing carried out in the multi-channel echo cancellation and noise suppression module 106. Specifically, four different types of flags may be generated and used by the subsequent modules for optimal performance: clipping flags 260, a far-end flag 246, a double-talk flag 244 and a near-end flag 250.

The clipping flags 260 may be generated within the linear echo canceller 214 based on the echo attenuation provided by the linear echo canceller 214. The clipping flags 260 may be used by the echo post-processor 218 for residual echo suppression. In speakerphone environments, acoustic echoes may be a major problem, and the desired talker-to-echo ratio may be on the order of −4 to −12 dB. The clipping flags 260 may be used in the full-band non-linear echo clipper 256 to further suppress the residual echo. These clipping flags 260 may be generated using the echo attenuation provided by the linear echo canceller 214. If the echo attenuation provided by the linear echo canceller 214 is high, that may imply strong echo portions that are most likely echo-only periods. Thus, the residual signal after echo cancellation and noise suppression may be further suppressed. Since the primary channel survives the noise suppression scheme, the echo attenuation provided by the linear echo canceller 214 of the primary channel in the lower and higher bands may be used to determine values for two non-linear clipping flags 260 for the corresponding frequency bands.

A far-end flag 246 may also be determined that indicates far-end voice activity. A simple energy-based voice activity detector (VAD) may be used to detect the far-end activity. Thresholds for far-end voice activity may be chosen at a higher end so that only relatively strong far-end speech 226 portions are detected. Specifically, it may be desirable to detect those portions of far-end speech 226 that may leave some residual echo after the linear echo cancellation. This binary far-end flag 246 may be used by the noise suppressor 216 to determine whether to learn the source position and to avoid accidentally learning in the direction of the echo as the desired source direction. In one configuration, the far-end flag 246 may be used to determine the double-talk flag 244 that is used to determine whether the spatial processor 238 should attempt to learn in the direction of a desired signal.

The double-talk flag 244 may update the status of the linear echo canceller 214. In other words, the double-talk flag 244 may be high in true double-talk situations, i.e. true overlap of far-end and near-end speech periods. The double-talk flag 244 may also be high when the echo attenuation provided by the linear echo canceller 214 is very low. Therefore, the double-talk flag 244 may serve two different objectives. First, the double-talk flag 244 may prevent spatial processing and source learning by the spatial processor 238 during true double-talk periods, thereby preventing any undesirable near-end talker attenuation during such periods. Second, the double-talk flag 244 may also be high when the echo attenuation provided by the linear echo canceller 214 is minimal. Source learning may not be performed by the spatial processor 238 during such periods to prevent any accidental learning towards the relatively strong residual acoustic echoes.

A near-end flag 250 may also be determined that indicates near-end voice activity. The near-end flag 250 may be used by the echo post-processor 218 to determine the aggressiveness of the non-linear echo post-processing. For example, any double-talk detection flag 244 may serve as a near-end flag 250.

Figure 3:
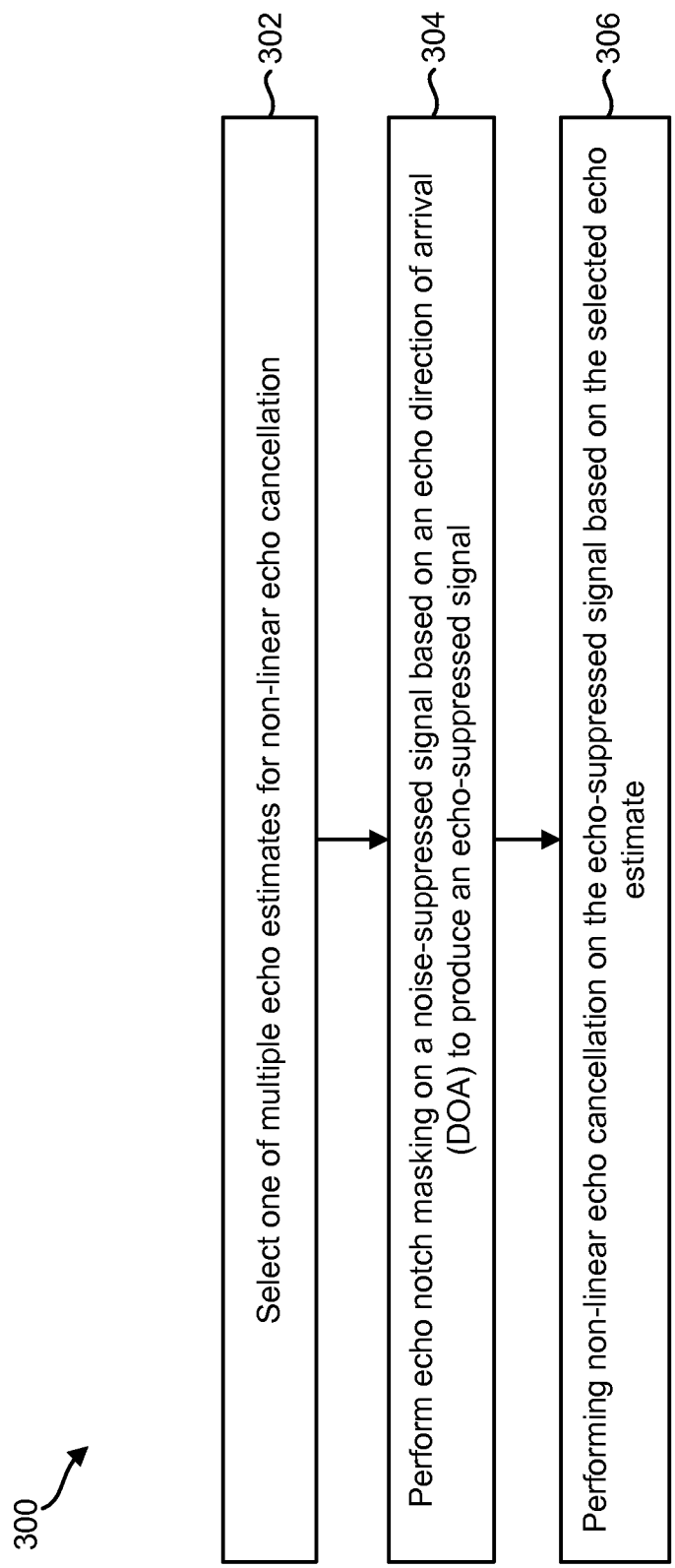
FIG. 3 is a flow diagram illustrating a method for multi-channel echo cancellation and noise suppression.

FIG. 3 is a flow diagram illustrating a method 300 for multi-channel echo cancellation and noise suppression. The method 300 may be performed by a communication device 102, e.g., as illustrated in FIG. 1.

The communication device 102 may select 302 one of multiple echo estimates for non-linear echo cancellation. The communication device 102 may determine a primary microphone echo estimate ($\hat{y}_1$) 236a and a secondary microphone echo estimate ($\hat{y}_2$) 236b during linear echo cancellation of at least two microphone channels. This may include modeling a room response in an acoustic echo canceller (AEC) filter 228b for a primary microphone 204a and a secondary microphone 204b, determining the primary microphone echo estimate ($\hat{y}_1$) 236a based on the room response for the primary microphone 204a and determining the second microphone echo estimate ($\hat{y}_2$) 236b based on the room response for the secondary microphone 204b.

The communication device 102 may spatial process the primary microphone echo estimate ($\hat{y}_1$) 236a and the secondary microphone echo estimate ($\hat{y}_2$) 236b to produce a spatial-processed echo estimate 252. In one configuration, the spatial processing may replicate the processing done on linear echo-cleaned outputs by a spatial processor 238 in a noise suppressor 216.

The communication device 102 may select 302 one of the spatial-processed echo estimate 252, the primary microphone echo estimate ($\hat{y}_1$) 236a and the secondary microphone echo estimate ($\hat{y}_2$) 236b for non-linear echo cancellation. The communication device 102 may select 302 an echo estimate based on a maxima of the multiple echo estimates. The communication device 102 may also select 302 a combination of the multiple echo estimates to produce the selected echo estimate 266. One or more of the primary microphone echo estimate ($\hat{y}_1$) 236a, the secondary microphone echo estimate ($\hat{y}_2$) 236b and the spatial-processed echo estimate 252 may be adjusted or combined in various ways. For example, the communication device 102 may scale the selected echo estimate 266. The communication device 102 may combine two or more echo estimates through addition, subtraction, scaling, averaging, etc.

Linear echo cancellation may further include subtracting the primary microphone echo estimate ($\hat{y}_1$) 236a from a primary microphone channel to produce a linear echo-cleaned primary microphone channel and subtracting the secondary microphone echo estimate ($\hat{y}_2$) 236b from a secondary microphone channel to produce a linear echo-cleaned secondary microphone channel. The communication device 102 may produce a noise-suppressed signal 262 based on the linear echo-cleaned primary and secondary microphone channels. In one configuration, noise suppression may include spatially processing the linear echo-cleaned primary microphone channel and the linear echo-cleaned secondary microphone channel. Noise suppression post-processing may include non-linear, spectral-subtraction based processing where a noise reference from the spatial processing serves as the unwanted component.

The communication device 102 may perform 304 echo notch masking on a noise-suppressed signal 262 based on an echo direction of arrival (DOA) to produce an echo-suppressed signal. Echo notch masking may include amplitude suppression based on speech likelihood information 248 that indicates the likelihood of a specific beam to be dominated by echo or not. The communication device 102 may calculate speech likelihood information 248 during spatial processing of the linear echo-cleaned primary microphone channel and the linear echo-cleaned secondary microphone channel. The speech likelihood information 248 may indicate the likelihood per angle per frequency bin for speech. The spatial processing may determine an estimated direction for each frequency bin. Using the speech likelihood information 248, frequency bins that have a high-likelihood for an echo DOA can be suppressed.

The echo DOA may be determined based on the location of the one or more microphones 204 and the one or more loudspeakers 208. In one configuration, if the one or more loudspeakers 208 are fixed with respect to the communication device 102, then the echo DOA may be determined during a calibration stage. In another configuration, if the one or more loudspeakers 208 are non-fixed (e.g., auxiliary) with respect to the communication device 102, then the echo DOA may be determined in real-time when far-end activity is detected.

Upon determining the echo DOA, the communication device 102 may determine a masking gain to apply to the noise-suppressed signal 262 to produce an echo-suppressed signal. The communication device 102 may selectively suppress frequency bins that are likely to include an echo signal. In one configuration, the communication device 102 may apply a masking window located based on the echo DOA with a certain margin around the echo DOA. If the direction (e.g., angle) of a frequency bin of the noise-suppressed signal 262 falls within the masking window, then the communication device 102 may apply a masking gain to the frequency bin to produce the echo-suppressed signal.

The communication device 102 may perform 306 non-linear echo cancellation on the echo-suppressed signal based, at least in part, on the selected echo estimate 266. The non-linear echo cancellation may include using a non-linear echo model based on the selected echo estimate 266 and the echo-suppressed signal. For example, the communication device 102 may include a non-linear echo model of the harmonic distortions created due to the loudspeaker 208. The communication device 102 may apply the echo-suppressed signal to the non-linear model to obtain a non-linear echo estimate. The communication device 102 may use a spectral subtraction-based scheme to remove any residual non-linear echo. Furthermore, the communication device 102 may cancel any residual echo that may have been added by spatial processing during noise suppression by using the selected echo estimate 266. The communication device 102 may perform spectral subtraction using the selected echo estimate 266 to cancel echo in the noise-suppressed signal 262.

Figure 4:
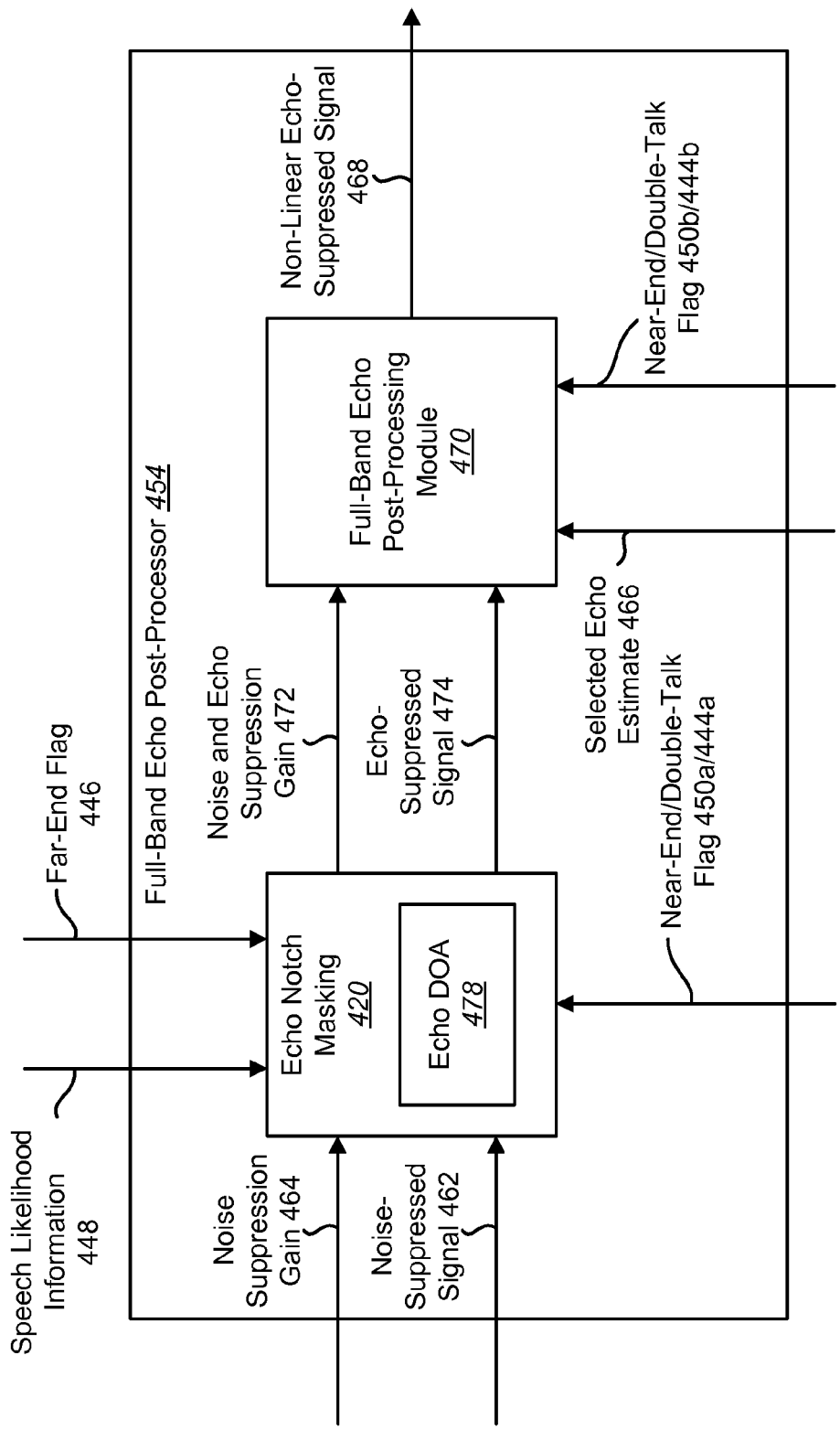
FIG. 4 is a block diagram of a full-band echo post-processor configured for multi-channel echo cancellation and noise suppression.

FIG. 4 is a block diagram of a full-band echo post-processor 454 configured for multi-channel echo cancellation and noise suppression. The full-band echo post-processor 454 may be included in an echo post-processor 118 of a communication device 102, as described above in connection with FIG. 1. The full-band echo post-processor 454 may include an echo notch masking module 420 and a full-band echo post-processing module 470.

The echo notch masking module 420 may receive a noise-suppressed signal 462 (from a noise suppressor 216, for example). The noise-suppressed signal 462 may be produced as described above in connection with FIG. 2. For example, the noise suppressor 216 may spatially process a linear echo-cleaned primary microphone channel and a linear echo-cleaned secondary microphone channel. The noise suppressor 216 may then perform noise suppression post-processing that may include non-linear, spectral-subtraction based processing where a noise reference from the spatial processing serves as the unwanted component.

The echo notch masking module 420 may perform amplitude suppression based on speech likelihood information 448 that indicates the likelihood of a specific beam to be dominated by echo or not. In one configuration, echo notch masking module 420 may receive the speech likelihood information 448 from a spatial processor 238, as described above in connection with FIG. 2. The speech likelihood information 448 may indicate the likelihood per angle per frequency bin for target speech.

An echo direction of arrival (DOA) 478 may be determined based on the location of the one or more microphones 204 and the one or more loudspeakers 208. In one configuration, the echo DOA 478 may be determined by playing back only the echo signal. For a fixed loudspeaker 108, the echo DOA 478 may be determined during a calibration stage, as described below in connection with FIG. 5. For one or more auxiliary loudspeakers 108, the echo DOA 478 may be determined in real-time when far-end activity is detected, as described below in connection with FIG. 6. The echo DOA 478 may be expressed as an angle. Speech that has a high likelihood at the echo DOA 478 may be assumed to be echo.

Upon determining the echo DOA 478, the echo notch masking module 420 may determine a masking gain to apply to the noise-suppressed signal 462. The echo notch masking module 420 may selectively suppress frequency bins that are likely to include an echo signal. In one configuration, a likelihood threshold may be set (e.g., 0.9*theoretical maximum likelihood). If the likelihood associated with a frequency bin is above the likelihood threshold, then a masking gain calculation may be applied to that frequency bin. The echo notch masking module 420 may apply a masking window located based on the echo DOA 478 with a certain margin around the echo DOA 478. If the direction of a frequency bin of the noise-suppressed signal 462 falls within the masking window, then the echo notch masking module 420 may apply a masking gain to the frequency bin to produce an echo-suppressed signal 474.

In one configuration, the echo notch masking module 420 may be activated during far-end activity. For example, the echo notch masking module 420 may be activated upon receipt of a far-end flag 446 and may be deactivated upon receipt of a double-talk flag 444a or a near-end flag 450a.

The echo notch masking module 420 may provide the echo-suppressed signal 474 and noise and echo suppression gain 472 to the full-band echo post-processing module 470 for non-linear echo cancellation. This may be accomplished as described in connection with FIG. 2. For example, the full-band echo post-processing module 470 may perform non-linear model-based echo cancellation on the echo-suppressed signal 474 based on the selected echo estimate 466 to produce a non-linear echo-suppressed signal 468. The full-band echo post-processing module 470 may apply smoothing based on the noise and echo suppression gain 472 to avoid musical noise artifacts.

The noise and echo suppression gain 472 may include the masking gain in addition to the noise suppression gain 464. The noise and echo suppression gain 472 may be passed to the full-band echo post-processing module 470 to control the aggressiveness of the post-processing according to the gain already applied to the echo-suppressed signal 474. If the gain applied to the echo-suppressed signal 474 is already aggressive, then the full-band echo post-processing module 470 may apply a less aggressive gain (or vice versa), which may achieve more consistent echo cancellation and noise suppression. A near-end flag 450b or double-talk flag 444b may be used by the full-band echo post-processing module 470 to determine the aggressiveness of the non-linear echo post-processing. In one configuration, any double-talk flag 444b may serve as a near-end flag 450b.

Figure 5:
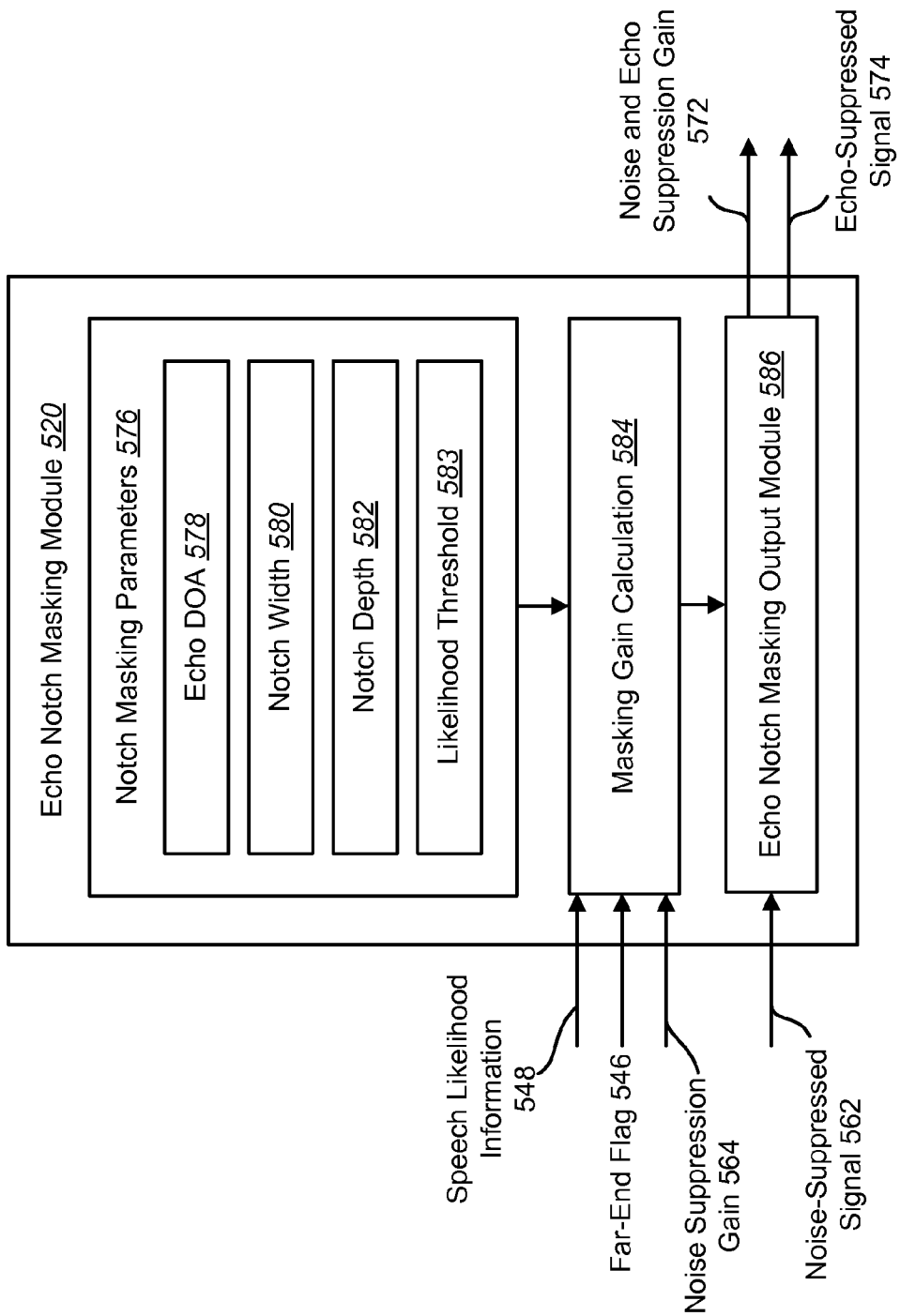
FIG. 5 is a block diagram of one configuration of an echo notch masking module.

FIG. 5 is a block diagram of one configuration of an echo notch masking module 520. The echo notch masking module 520 may be included in a full-band echo post-processor 454, as described above in connection with FIG. 4. The echo notch masking module 520 illustrated in FIG. 5 may be used for a fixed-loudspeaker scenario. The loudspeaker 108 position may be fixed on the communication device 102 in typical handset operation. The echo notch masking module 520 may selectively suppress frequency bins in a noise-suppressed signal 562 that are likely to include an echo signal.

The echo notch masking module 520 may include notch masking parameters 576. The echo notch masking module 520 may determine the fixed echo DOA 578 during a calibration stage by playing back only an echo signal. In one configuration, this may be accomplished by performing an anglogram calculation (by a spatial processor 238). The echo DOA 578 may be obtained ahead of run-time and stored in the notch masking parameters 576. Because the loudspeaker 108 position is fixed on the communication device 102, the echo DOA 578 is also fixed. In one configuration, the echo DOA 578 may be expressed as an angle.

Upon determining the echo DOA 578, the echo notch masking module 520 may determine a notch width 580 and a notch depth 582. The notch width 580 may be a margin that forms a masking window. In one configuration, the notch width 580 may be a number of degrees from the echo DOA 578 that may be included in the notch masking calculation. For example, the notch width 580 may be plus or minus 10 degrees from the echo DOA 478. It should be noted that other values for the notch width 580 may be utilized. The notch depth 582 may be the amount of masking gain that may be applied to a frequency bin at the echo DOA 578. In one configuration, the echo notch masking module 520 may apply linear suppression in between the notch width 580.

A masking gain calculation module 584 may receive speech likelihood information 548 for a frame. The speech likelihood information 548 may indicate the likelihood per angle per frequency bin for target speech. In one configuration, the speech likelihood information 548 may be determined by performing an anglogram calculation by the spatial processor 238. The masking gain calculation module 584 may apply a likelihood threshold 583 to the frequency bins for each angle to determine whether to perform notch masking on a frequency bin. If the speech likelihood for a frequency bin is greater than the likelihood threshold 583, then the masking gain calculation module 584 may calculate the masking gain for that frequency bin based on the notch width 580 and notch depth 582. By using notch filtering, the echo notch masking module 520 may notch out the echo signal corresponding to the echo DOA 578 for each echo beam to suppress echo leakage.

Figure 7:
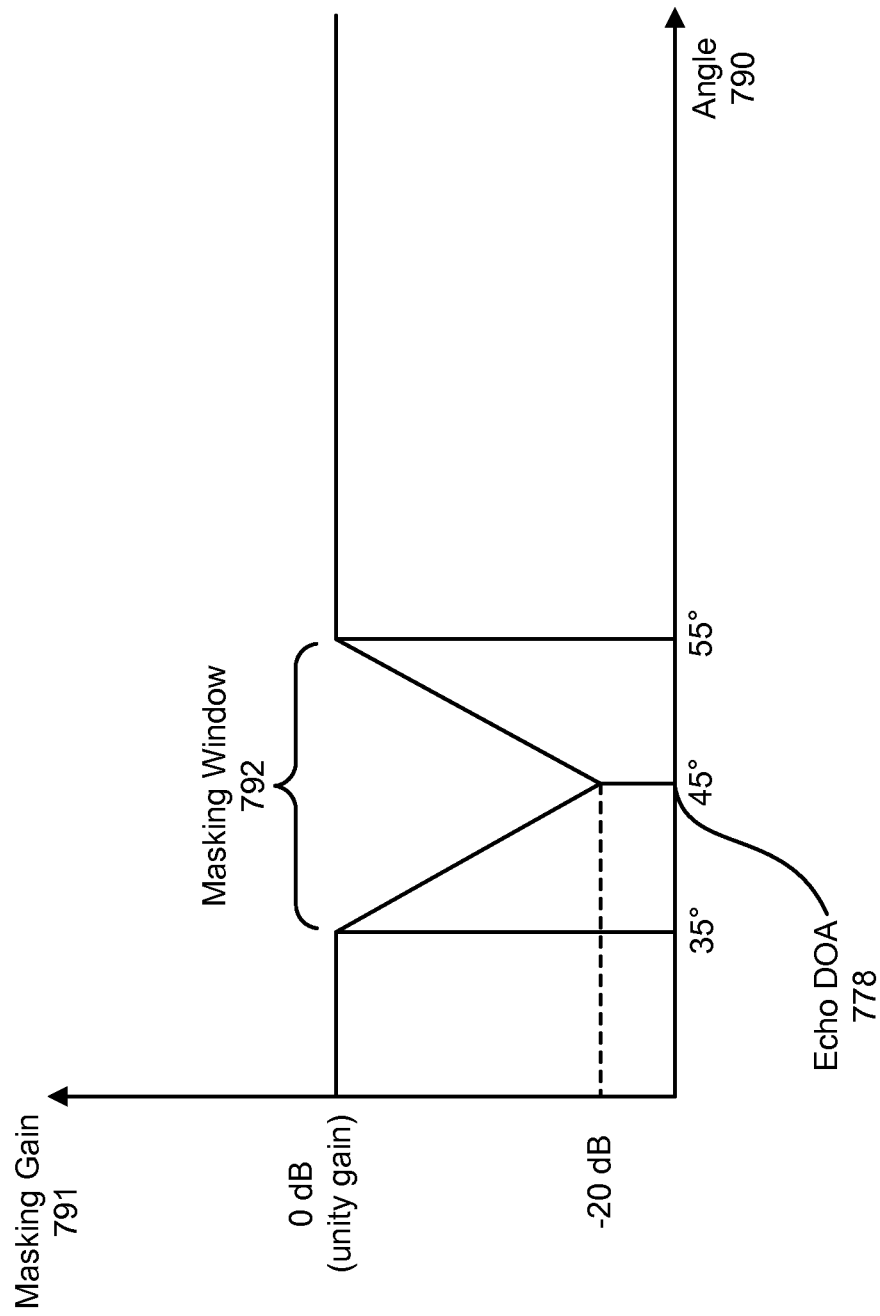
FIG. 7 is a graph depicting one configuration of echo notch masking.

The masking gain calculation module 584 may determine an amount to suppress the noise-suppressed signal 562 within the masking window. If the angle of a frequency bin is outside the notch masking window (defined by the echo DOA 578 and the notch width 580), then no masking gain is applied (e.g., a 0 dB unity gain may be applied). However, if the angle of a frequency bin is within the masking window, then the masking gain for the frequency bin may be determined based on the notch depth 582. The masking gain calculation module 584 may perform notch masking for each frame. An example of notch masking is illustrated in FIG. 7.

In one configuration, the noise-suppressed signal 562 represents a beam-nullformed output from the NS module 216 to suppress a near-end interferer. The noise suppression gain 564 represents the calculated NS post-processing gain. If there is no far-end activity, the echo notch masking output module 586 becomes a simple post-processing scheme for applying the noise suppression gain 564. If there is far-end activity, then the additional post-processing gain (e.g., a masking gain for the echo) as determined by the masking gain calculation module 584 may be applied together with the existing noise suppression gain 564. One possible combination of these two different gains to obtain a final post-processing gain (e.g., the noise and echo suppression gain 572) is to apply both the noise suppression gain 564 and the masking gain together. In another configuration, a minimum suppression gain constraint may be applied. The minimum suppression gain may be selected from the minimum of the noise suppression gain 564, masking gain and the combined noise and echo suppression gain 572.

Upon determining the masking gain, the echo notch masking output module 586 may apply the masking gain to the noise-suppressed signal 562. For example, selected frequency bins may be suppressed according to the determined masking gain to produce the echo-suppressed signal 574. This may further suppress residual echo in the noise-suppressed signal 562. The echo notch masking output module 586 may also output the noise and echo suppression gain 572, which may include the masking gain and the noise suppression gain 564.

In one configuration, the echo notch masking module 520 may be activated during far-end activity. For example, the echo notch masking module 520 may be activated upon receipt of a far-end flag 546 at the masking gain calculation module 584.

Figure 6:
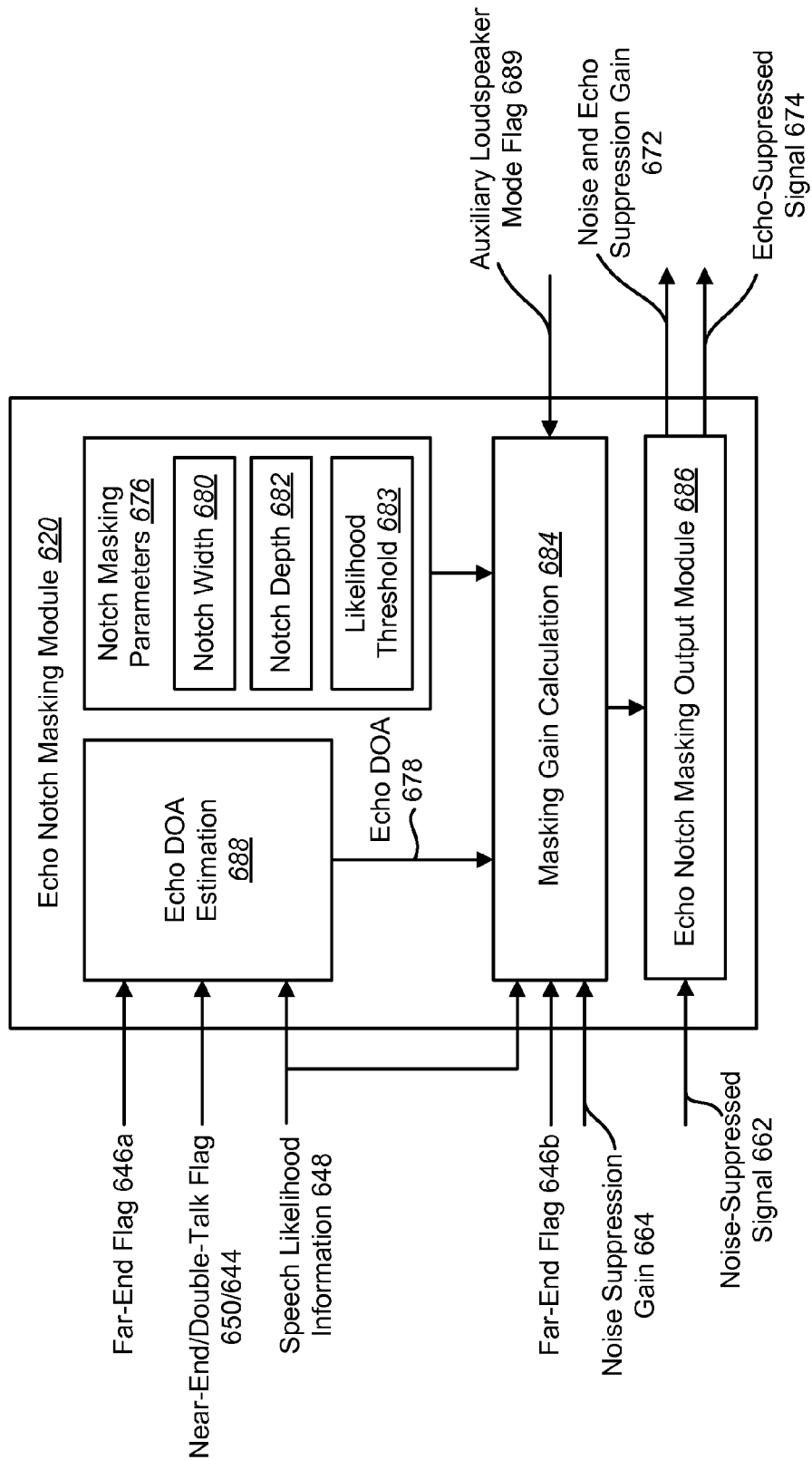
FIG. 6 is a block diagram of another configuration of an echo notch masking module.

FIG. 6 is a block diagram of another configuration of an echo notch masking module 620. The echo notch masking module 620 may be included in a full-band echo post-processor 454, as described above in connection with FIG. 4. The echo notch masking module 620 illustrated in FIG. 6 may be used for a non-fixed loudspeaker scenario. For example, the one or more loudspeakers 108 may be auxiliary loudspeakers 108. This configuration may be used with an array of loudspeakers 108 that may be attached to the communication device 102 (during teleconferencing, for instance). Furthermore, auxiliary loudspeakers 108 may connect to the communication device 102 when there are alternative devices (e.g., a TV) that may communicate with the communication device 102.

In this case, the echo DOA 678 may be time-varying, as the microphone 104 positions change relative to the one or more loudspeakers 108. Therefore, the echo notch masking module 620 may include an echo DOA estimation module 688 to determine the echo DOA 678 during run-time. This may be accomplished as described above in connection with FIG. 5, but instead of determining the echo DOA 678 once during calibration, the echo DOA estimation module 688 may determine the echo DOA 678 on a frame-by-frame basis, when far-end activity is detected (as indicated by a far-end flag 646*a*). In one configuration, the echo DOA estimation module 688 may be deactivated upon receipt of a near-end flag 650 or a double-talk flag 644.

The echo notch masking module 620 may determine whether a user is using in-device loudspeaker 108 or an auxiliary loudspeaker 108. In one configuration, the echo notch masking module 620 may receive an auxiliary loudspeaker mode flag 689 upon activation of an auxiliary path for the auxiliary loudspeaker 108. Upon receipt of the auxiliary loudspeaker mode flag 689, the echo DOA estimation module 688 may determine the echo DOA 678 based on speech likelihood information 648 for a frame (obtained from a spatial processor 238). For example, the spatial processor 238 may perform an anglogram calculation by playing back an echo signal to obtain the speech likelihood information 648.

The echo notch masking module 620 may include notch masking parameters 676. Upon determining the echo DOA 678, the echo notch masking module 620 may determine a notch width 680 and a notch depth 682, as described above in connection with FIG. 5. The echo notch masking module 620 may also set a likelihood threshold 683.

A masking gain calculation module 684 may receive the speech likelihood information 648. The speech likelihood information 648 may indicate the likelihood per angle per frequency bin for target speech. The masking gain calculation module 684 may determine the masking gain as described above in connection with FIG. 5. In one configuration, the masking gain calculation module 684 may determine the masking gain when a far-end flag 646*b* indicates far-end activity. Furthermore, the masking gain calculation module 684 may consider the noise suppression gain 664 when determining the aggressiveness of the masking gain. This may be accomplished as described above in connection with FIG. 5.

Upon determining the masking gain, the echo notch masking output module 686 may apply the masking gain to the noise-suppressed signal 662. For example, selected frequency bins may be suppressed according to the determined masking gain to produce the echo-suppressed signal 674. The echo notch masking output module 686 may also output the noise and echo suppression gain 672, which may include the masking gain and the noise suppression gain 664.

FIG. 7 is a graph depicting one configuration of echo notch masking. The echo notch masking may be performed by an echo notch masking module 120. FIG. 7 shows the masking gain 791 that may be applied for various angles 790. A spatial processor 238 may determine various spatial beams based on primary and secondary microphone channels. Each beam may be associated with a particular direction (e.g., angle 790). For each frame in time, a range of frequencies may be grouped in frequency bins. An estimated speech likelihood for each frequency bin may be determined for each angle 790. Frequency bins with a high-likelihood (e.g., above a likelihood threshold 583) to be within a certain margin of an echo DOA 778 may be suppressed.

In the example illustrated in FIG. 7, an echo DOA 778 is determined to be 45 degrees. In one configuration, the echo DOA 778 may be determined by performing an anglogram calculation during spatial processing, as described above in connection with FIG. 5. The notch width 580 of the masking window 792 is 20 degrees. Therefore, frequency bins with an angle 790 between 35 degrees and 55 degrees may be suppressed by a masking gain 791. Frequency bins with an angle 790 outside the masking window 792 will have a unity gain of 0 dB.

The masking window 792 may be located based on the echo DOA 778. In this example, the masking window 792 is centered on the echo DOA 778, with a 10 degree margin on either side of the echo DOA 778. However, in other configurations, the masking window 792 need not be centered on the echo DOA 778 (e.g., the margins on either side of the echo DOA 778 may be different).

For an angle 790 of 45 degrees (at the echo DOA 778), the masking gain 791 is −20 dB. The maximum masking gain 791 may be referred to as the notch depth 582. In this example, the masking gain 791 varies linearly within the masking window 792. In another configuration, the masking gain 791 may vary non-linearly within the masking window 792.

Figure 8:
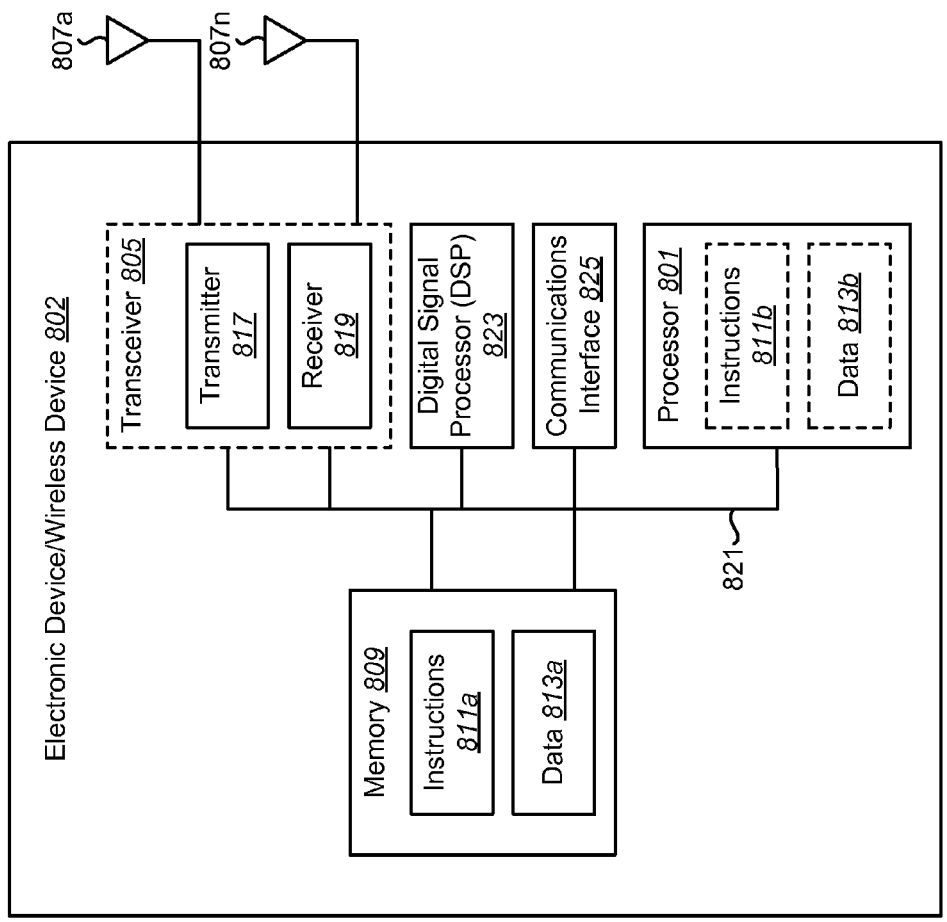
FIG. 8 illustrates certain components that may be included within an electronic device/wireless device.

FIG. 8 illustrates certain components that may be included within an electronic device/wireless device 802. The electronic device/wireless device 802 may be an access terminal, a mobile station, a user equipment (UE), a base station, an access point, a broadcast transmitter, a node B, an evolved node B, etc., such as the communication device 102 illustrated in FIG. 1. The electronic device/wireless device 802 includes a processor 801. The processor 801 may be a general purpose single- or multi-chip microprocessor (e.g., an Advanced RISC (Reduced Instruction Set Computer) Machine (ARM) processor), a special purpose microprocessor (e.g., a digital signal processor (DSP)), a microcontroller, a programmable gate array, etc. The processor 801 may be referred to as a central processing unit (CPU). Although just a single processor 801 is shown in the electronic device/wireless device 802 of FIG. 8, in an alternative configuration, a combination of processors (e.g., an ARM and DSP) could be used.

The electronic device/wireless device 802 also includes memory 809. The memory 809 may be any electronic component capable of storing electronic information. The memory 809 may be embodied as random access memory (RAM), read-only memory (ROM), magnetic disk storage media, optical storage media, flash memory devices in RAM, on-board memory included with the processor, erasable programmable read-only memory (EPROM), electrically erasable PROM (EEPROM), registers and so forth, including combinations thereof.

Data 813a and instructions 811a may be stored in the memory 809. The instructions 811a may be executable by the processor 801 to implement the methods disclosed herein. Executing the instructions 811a may involve the use of the data 813a that is stored in the memory 809. When the processor 801 executes the instructions 811a, various portions of the instructions 811b may be loaded onto the processor 801, and various pieces of data 813b may be loaded onto the processor 801.

The electronic device/wireless device 802 may also include a transmitter 817 and a receiver 819 to allow transmission and reception of signals to and from the electronic device/wireless device 802. The transmitter 817 and receiver 819 may be collectively referred to as a transceiver 805. Multiple antennas 807a-n may be electrically coupled to the transceiver 805. The electronic device/wireless device 802 may also include (not shown) multiple transmitters, multiple receivers, multiple transceivers and/or additional antennas.

The electronic device/wireless device 802 may include a digital signal processor (DSP) 823. The electronic device/wireless device 802 may also include a communications interface 825. The communications interface 825 may allow a user to interact with the electronic device/wireless device 802.

The various components of the electronic device/wireless device 802 may be coupled together by one or more buses, which may include a power bus, a control signal bus, a status signal bus, a data bus, etc. For the sake of clarity, the various buses are illustrated in FIG. 8 as a bus system 821.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IF-DMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 3, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for multi-channel echo cancellation and noise suppression, comprising:
    selecting one of multiple echo estimates for non-linear echo cancellation, wherein the multiple echo estimates include a spatial-processed echo estimate that estimates echo added by spatial processing during noise suppression;
    performing echo notch masking on a noise-suppressed signal based on an echo direction of arrival (DOA) to produce an echo-suppressed signal, wherein performing echo notch masking comprises:
        determining a masking gain based on speech likelihood information, a notch width, a notch depth, and the echo direction of arrival (DOA), wherein the speech likelihood information indicates a likelihood per angle per frequency bin for target speech, and
        applying the masking gain to the noise-suppressed signal to produce the echo-suppressed signal; and
    performing non-linear echo cancellation on the echo-suppressed signal based, at least in part, on the selected echo estimate.

2. The method of claim 1, wherein the one of multiple echo estimates is one of the spatial-processed echo estimate, a primary microphone echo estimate and a secondary microphone echo estimate.

3. The method of claim 1, wherein the selecting one of multiple echo estimates comprises selecting a maxima of the multiple echo estimates.

4. The method of claim 1, wherein the selecting one of multiple echo estimates comprises combining multiple echo estimates to produce the selected echo estimate.

5. The method of claim 1, wherein the performing non-linear echo cancellation comprises using a non-linear model of echo based on the selected echo estimate and the echo-suppressed signal.

6. A computer-program product for multi-channel echo cancellation and noise suppression, comprising a non-transitory computer-readable medium having instructions thereon, the instructions comprising:
    code for causing a communication device to select one of multiple echo estimates for non-linear echo cancellation, wherein the multiple echo estimates include a spatial-processed echo estimate that estimates echo added by spatial processing during noise suppression;
    code for causing the communication device to perform echo notch masking on a noise-suppressed signal based on an echo direction of arrival (DOA) to produce an echo-suppressed signal, wherein the code for causing the communication device to perform echo notch masking comprises:
        code for causing the communication device to determine a masking gain based on speech likelihood information, a notch width, a notch depth, and the echo direction of arrival (DOA), wherein the speech likelihood information indicates a likelihood per angle per frequency bin for target speech, and code for causing the communication device to apply the masking gain to the noise-suppressed signal to produce the echo-suppressed signal; and code for causing the communication device to perform non-linear echo cancellation on the echo-suppressed signal based, at least in part, on the selected echo estimate.

7. The computer-program product of claim 6, wherein the one of multiple echo estimates is one of the spatial-processed echo estimate, a primary microphone echo estimate and a secondary microphone echo estimate.

8. The computer-program product of claim 6, wherein the code for causing the communication device to select one of multiple echo estimates comprises code for causing the communication device to combine multiple echo estimates to produce the selected echo estimate.

9. The computer-program product of claim 6, wherein the noise-suppressed signal is produced by causing the communication device to suppress noise in output of a linear echo cancellation of at least two microphone channels.

10. The computer-program product of claim 9, wherein the linear echo cancellation comprises:
    code for causing the communication device to subtract a primary microphone echo estimate from a primary microphone channel; and
    code for causing the communication device to subtract a secondary microphone echo estimate from a secondary microphone channel.

11. The computer-program product of claim 9, further comprising code for causing the communication device to spatial process a primary microphone echo estimate and a secondary microphone echo estimate to produce the spatial-processed echo estimate.

12. The computer-program product of claim 11, wherein the code for causing the communication device to spatial process replicates spatial processing that is performed by the causing the communication device to suppress noise in output of the linear echo cancellation.

13. The computer-program product of claim 11, wherein code for causing the communication device to determine the primary microphone echo estimate and the secondary microphone echo estimate comprises:
    code for causing the communication device to model a room response in an acoustic echo canceller (AEC) filter for a primary microphone and a secondary microphone;
    code for causing the communication device to determine the primary microphone echo estimate based on the room response for the primary microphone; and
    code for causing the communication device to determine the second microphone echo estimate based on the room response for the secondary microphone.

14. The computer-program product of claim 11, wherein the primary microphone echo estimate and the secondary microphone echo estimate are determined during the linear echo cancellation.

15. A communication device for multi-channel echo cancellation and noise suppression, comprising:
    a processor;
    memory in electronic communication with the processor;
    instructions stored in memory, the instructions executable to:
    select one of multiple echo estimates for non-linear echo cancellation, wherein the multiple echo estimates include a spatial-processed echo estimate that estimates echo added by spatial processing during noise suppression;
    perform echo notch masking on a noise-suppressed signal based on an echo direction of arrival (DOA) to produce an echo-suppressed signal, wherein the instructions executable to perform echo notch masking comprise instructions executable to:
        determine a masking gain based on speech likelihood information, a notch width, a notch depth, and the echo direction of arrival (DOA), wherein the speech likelihood information indicates a likelihood per angle per frequency bin for target speech, and
        apply the masking gain to the noise-suppressed signal to produce the echo-suppressed signal; and
    perform non-linear echo cancellation on the echo-suppressed signal based, at least in part, on the selected echo estimate.

16. The communication device of claim 15, wherein the one of multiple echo estimates is one of the spatial-processed echo estimate, a primary microphone echo estimate and a secondary microphone echo estimate.

17. The communication device of claim 15, wherein the instructions executable to select one of multiple echo estimates comprise instructions executable to combine multiple echo estimates to produce the selected echo estimate.

18. The communication device of claim 15, wherein the echo direction of arrival (DOA) is determined based on a location of one or more microphones and one or more loudspeakers.

19. The communication device of claim 15, wherein the echo direction of arrival (DOA) is determined during a calibration stage.

20. The communication device of claim 15, wherein the echo direction of arrival (DOA) is determined in real-time when far-end activity is detected.

21. The communication device of claim 15, wherein the instructions executable to determine the masking gain comprise instructions executable to:
    apply a masking window located based on the echo direction of arrival (DOA); and
    determine an amount to suppress the noise-suppressed signal within the masking window.

22. The communication device of claim 15, wherein the instructions executable to perform echo notch masking are further based on an indication of far-end speech.

23. A communication device for multi-channel echo cancellation and noise suppression, comprising:
    means for selecting one of multiple echo estimates for non-linear echo cancellation, wherein the multiple echo estimates include a spatial-processed echo estimate that estimates echo added by spatial processing during noise suppression;
    means for performing echo notch masking on a noise-suppressed signal based on an echo direction of arrival (DOA) to produce an echo-suppressed signal, wherein the means for performing echo notch masking comprises:
        means for determining a masking gain based on speech likelihood information, a notch width, a notch depth, and the echo direction of arrival (DOA), wherein the speech likelihood information indicates a likelihood per angle per frequency bin for target speech, and
        means for applying the masking gain to the noise-suppressed signal to produce the echo-suppressed signal; and
    means for performing non-linear echo cancellation on the echo-suppressed signal based, at least in part, on the selected echo estimate.

24. The communication device of claim 23, wherein the one of multiple echo estimates is one of the spatial-processed echo estimate, a primary microphone echo estimate and a secondary microphone echo estimate.

25. The communication device of claim 23, wherein the means for selecting one of multiple echo estimates comprise means for combining multiple echo estimates to produce the selected echo estimate.

\* \* \* \* \*